D. L. FRANK & S. B. PETER.
KAFIR CORN HARVESTER.
APPLICATION FILED MAY 6, 1912.
1,047,031.
Patented Dec. 10, 1912.
2 SHEETS—SHEET 1.
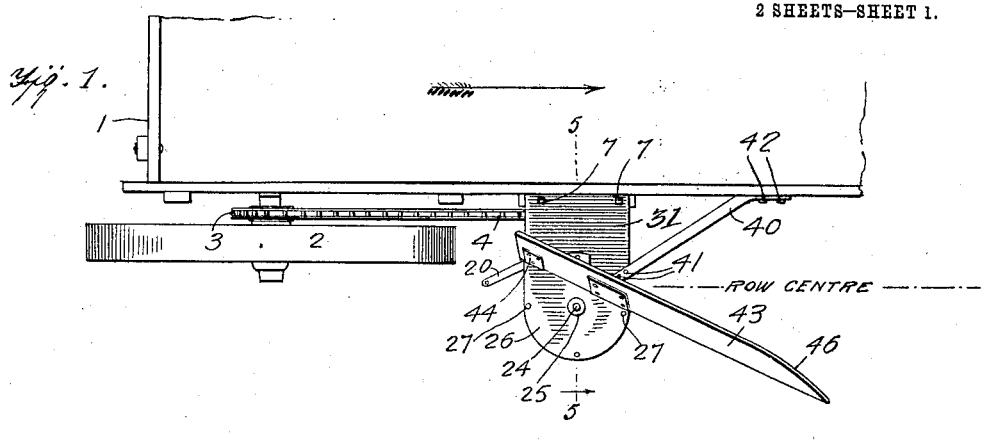
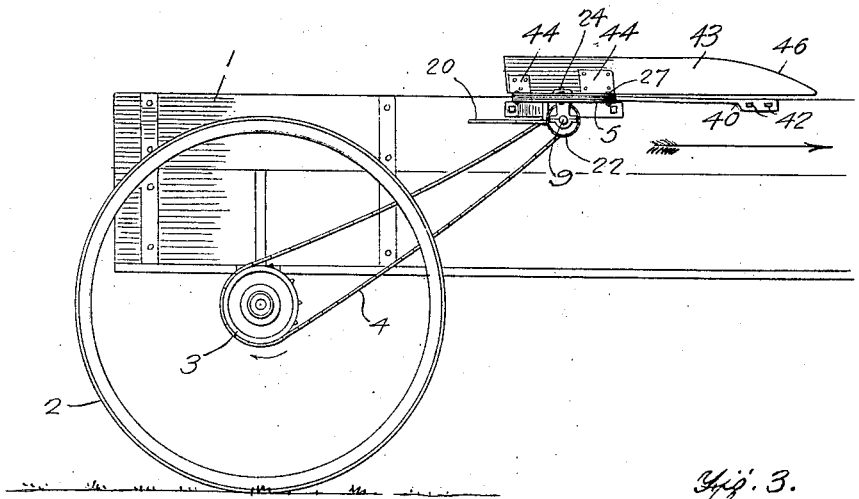
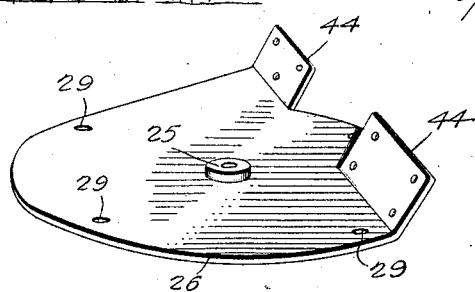
WITNESSES
INVENTORS
DANIEL L. FRANK,
SILAS B. PETER,
BY
ATTORNEYS

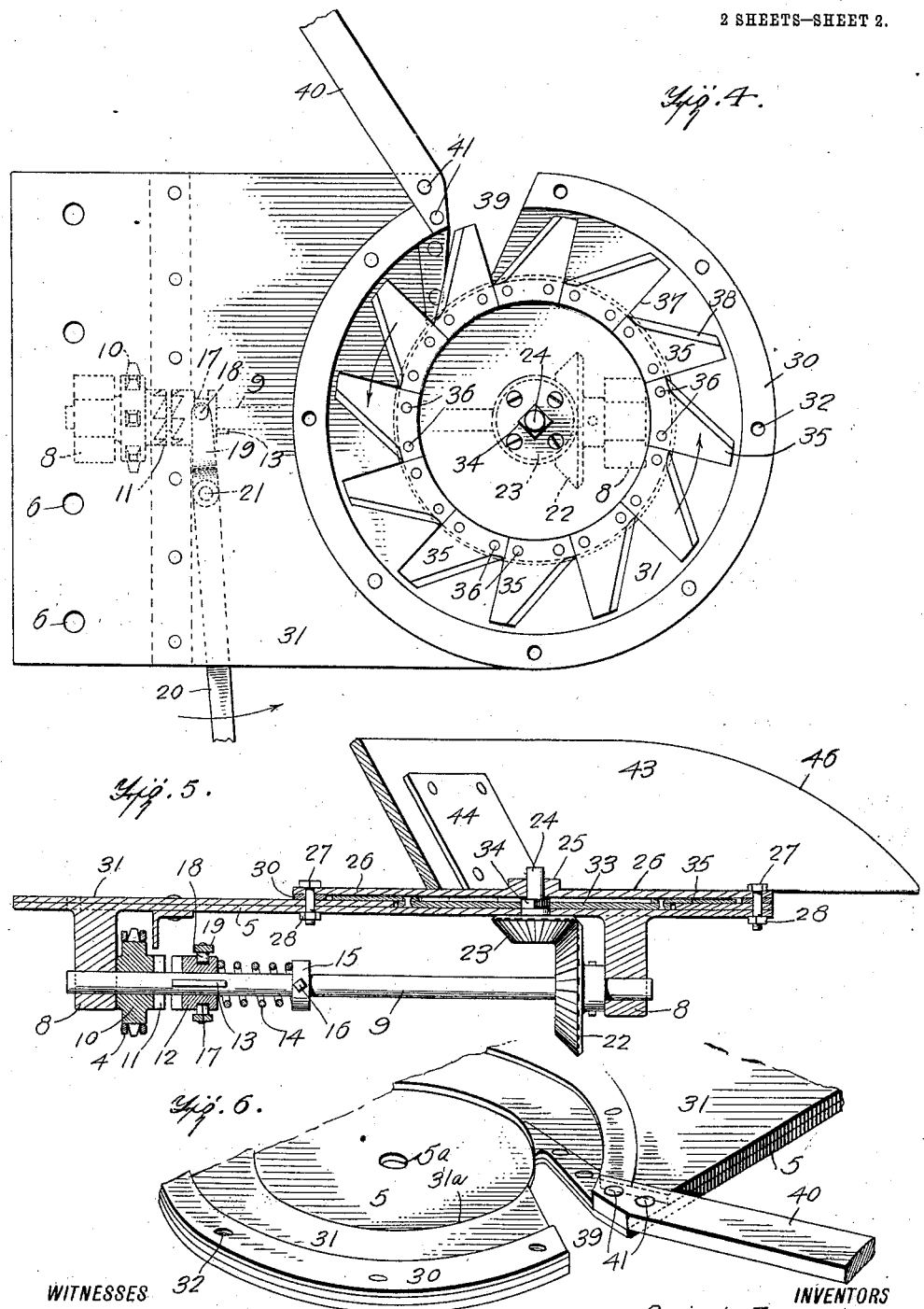

UNITED STATES PATENT OFFICE.

DANIEL L. FRANK, OF BURDEN, AND SILAS B. PETER, OF PITTSBURG, KANSAS.

KAFIR-CORN HARVESTER.

1,047,031. Specification of Letters Patent. Patented Dec. 10, 1912.

Application filed May 6, 1912. Serial No. 695,378.

*To all whom it may concern:*

Be it known that we, DANIEL L. FRANK, a citizen of the United States, and a resident of Burden, in the county of Cowley and State of Kansas, and SILAS B. PETER, a citizen of the United States, and a resident of Pittsburg, in the county of Crawford and State of Kansas, have invented a new and Improved Kafir-Corn Harvester, of which the following is a specification.

Our invention is an improvement in Kafir-corn harvesters, and has for its object the provision of a simple inexpensive device for attachment to an ordinary farm wagon, for cutting the stalks of the corn to remove the valuable portion.

In the drawings, Figure 1 is a top plan view of the improvement in place; Fig. 2 is a side view; Fig. 3 is a perspective view of the top plate, of the support; Fig. 4 is an enlarged plan view of the device, with the top casing removed to show the cutter; Fig. 5 is a section on the line 5—5 of Fig. 1; and Fig. 6 is a perspective view of the support for the cutting disk with the top plate and cutter removed.

The present embodiment of the invention is shown connected to the bed 1 of an ordinary farm wagon, and the device is operated from one of the rear wheels 2. A sprocket wheel 3 is secured to the inner side of the wheel 2, and a chain 4 is provided for connecting the sprocket wheel to the device.

The improvement comprises a plate 5 having one end straight, and provided with a plurality or series of openings 6, for receiving bolts 7 to connect it to the top of the bed. The plate is provided with a pair of spaced, alined, depending bearing lugs 8, and a shaft 9 is journaled in the lugs, the said shaft being approximately parallel with the axle. A sprocket wheel 10 is journaled loosely on the shaft, near its inner end, and the chain 4 before-mentioned connects the wheel 3 with the said wheel 10. The sprocket wheel 10 carries the fixed section 11 of a clutch, and the movable section 12 of the clutch is fastened to the shaft 9 by a feather 13, and is normally pressed toward the wheel 10 by a spring 14. The spring 14 encircles the shaft between the section 12 and a collar 15 secured to the shaft by a set screw 16. The section 12 of the clutch has an annular groove 17 in which engage radial rollers 18, journaled on the arms 19 of a fork on the inner end of a lever 20. The lever 20 is pivoted to the plate 5 intermediate the ends of the lever as shown at 21, and the sprocket wheel may be connected to or disconnected from the shaft by moving the outer end of the lever in the proper direction. A bevel gear wheel 22 is secured to the shaft, near its outer end, and the said wheel meshes with a bevel pinion 23 on a vertical stub shaft 24 journaled in an opening 5ª of plate 5 and in a bearing boss 25, in a second plate 26. The plate 26, Fig. 3, is spaced above the plate 5, and is connected thereto, by means of bolts 27. The bolts are passed through openings 29 in plate 26, and through registering openings in plate 5, and nuts 28 engage the bolts below plate 5.

A plate 31 is superposed on plate 5, the plates 5 and 31 being of the same size, as shown in Fig. 5, and a portion 31ª of plate 31 is cut away surrounding the stub shaft 24. A ring 30 rests upon plate 31, between plate 26 and plate 31, as shown in Fig. 5, and the ring is provided with openings 32 for the bolts 27. The plate 31 is also provided with openings for the said bolts.

A disk 33 is secured to the stub shaft in the cut away portion of plate 31, the disk having a central polygonal opening engaging a similarly shaped enlarged portion 34 of the shaft. A plurality of blades 35 are secured to the edge of the disk, on its upper face, by means of rivets 36. Each of the blades 35 has one edge 37 approximately radial to the shaft, and the other edge 38 is inclined with respect to edge 37, and is also beveled or sharpened. The blades move between the plate 26 and plate 31. The plates 5 and 31 are recessed or notched, at their outer side, as shown at 39, Figs. 1, 4 and 6, the recess being tangential to the cut-away portion 31ª of plate 31. The ring 30 is also cut away at the said recess.

A guide or guard bar 40 has one end secured to plates 5 and 31 at the inner side of recess 39, as shown at 41, and the other end of the bar is secured to the wagon bed, as indicated at 42. The bar is inclined with respect to the bed, and a guard or guide plate 43 is arranged at the opposite side of the recess. The bar 40 and plate 43 converge toward the recess, and act as guides, to guide the stalks into the recess 39. The plate 43 is arranged with its wide dimension vertical, and is secured to a pair of alined spaced lugs 44 at the inner edge of plate 26. The upper edge of the plate is beveled at the outer end of the plate, as shown at 46.

In operation, the wagon with the improvement in place is drawn through the field, with the center of the row in alinement with the recess 39. The clutch sections are connected so that the movement of the wagon will rotate the shaft 24 and the cutter disk. As the wagon moves forward, the stalks are guided into the recess by the guide arms 40 and 43, and the stalks are cut by the blades 35. As the stalks are cut they may be caught by some one in the wagon and laid in the wagon. One person can handle the stalks, and the operation is continuous until the wagon is loaded. As the stalks are slightly bent toward the wagon, the heads when severed by the knives on the revolving disk will fall into the wagon bed.

We claim:—

1. In combination with a wagon, a pair of superposed plates having at one end a series of openings for permitting the plates to be attached to the wagon, the upper plate having a substantially circular opening near its outer end, a ring arranged coaxial with the opening and of greater internal diameter, a plate superposed on the ring, bolts connecting the plates and ring together, a shaft journaled in the plates at the axis of the opening, a disk in the opening secured to the shaft, cutting blades secured to the edge of the disk and moving between the upper plate and the recessed plate, said plates and ring being recessed at the front edges thereof, a guard arm at each side of the recess, said arms diverging toward their free ends, and means for connecting the shaft to the axle of the wagon, said means comprising a shaft journaled on the under face of the lower plate, approximately parallel to the axle, a wheel journaled loosely on the shaft, a driving connection between the wheel and the axle, a clutch for connecting the wheel to the shaft, and means for operating the clutch.

2. In combination with a wagon, a pair of superposed plates having at one end a series of openings for permitting the plates to be attached to the wagon, the upper plate having a substantially circular opening near its outer end, a ring arranged coaxial with the opening and of greater internal diameter, a plate superposed on the ring, bolts connecting the plates and ring together, a shaft journaled in the plates at the axis of the opening, a disk in the opening secured to the shaft, cutting blades secured to the edge of the disk and moving between the upper plate and the recessed plate, said plates and ring being recessed at the front edges thereof, a guard arm at each side of the recess, said arms diverging toward their free ends, and means for connecting the shaft to the axle of the wagon.

3. A device of the character specified, comprising a disk, cutting blades secured to the edge of the disk, each blade having a cutting edge substantially tangential to the disk, a shaft to which the disk is secured, a support for the shaft and disk, said support comprising a top and a bottom plate, an intermediate plate having a circular opening for the disk, a ring between the intermediate plate and the top plate, said ring being of greater internal diameter than the disk and arranged coaxial with the disk, said plates having means for permitting them to be connected to the body of a wagon with the disk horizontal, the plates and ring being recessed at the front side of the support, the recess extending through the opening of the intermediate plate, guard arms at the sides of the recess, said arms diverging toward their free ends, and means for connecting the shaft to the axle of the wagon.

4. A device of the character specified comprising a disk having radial knives, a support for the disk, said support comprising parallel top and bottom plates, and a ring between the edges of the plates, said disk and knives being between the plates and within the ring, said support being recessed to permit the knives to engage the corn and means for rotating the disk.

DAN. L. FRANK.
SILAS B. PETER.

Witnesses:
J. G. CRAWFORD,
A. FRENCH.

---

Copies of this patent may be obtained for five cents each, by addressing the "Commissioner of Patents, Washington, D. C."